US007796831B2

(12) United States Patent
Tanaka

(10) Patent No.: US 7,796,831 B2
(45) Date of Patent: Sep. 14, 2010

(54) DIGITAL CAMERA WITH FACE DETECTION FUNCTION FOR FACILITATING EXPOSURE COMPENSATION

(75) Inventor: Toshiyuki Tanaka, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 960 days.

(21) Appl. No.: 11/605,002

(22) Filed: Nov. 27, 2006

(65) Prior Publication Data

US 2007/0147701 A1 Jun. 28, 2007

(30) Foreign Application Priority Data

Dec. 27, 2005 (JP) ............................. 2005-373700

(51) Int. Cl.
*G06K 9/40* (2006.01)
*G06K 9/00* (2006.01)
*G03B 15/03* (2006.01)
*G03B 9/70* (2006.01)
*H04N 5/235* (2006.01)
*H04N 9/73* (2006.01)

(52) U.S. Cl. .................... 382/274; 382/118; 396/164; 396/166; 396/180; 396/187; 396/215; 348/221.1; 348/223.1; 348/224.1; 348/229.1; 348/230.1

(58) Field of Classification Search ................. 382/118, 382/274; 396/164, 166, 213, 168, 180, 187, 396/215; 348/221.1, 223.1, 224.1, 229.1, 348/230.1, 362
See application file for complete search history.

(56) References Cited

U.S. PATENT DOCUMENTS

| 7,020,345 | B2 * | 3/2006 | Tsai et al. ..................... 382/274 |
| 7,358,994 | B2 * | 4/2008 | Yano ........................... 348/254 |
| 7,471,846 | B2 * | 12/2008 | Steinberg et al. ............. 382/274 |
| 7,580,566 | B2 * | 8/2009 | Fukuda et al. ............... 382/168 |
| 2003/0012414 | A1 * | 1/2003 | Luo ............................ 382/118 |

FOREIGN PATENT DOCUMENTS

| JP | 2001-222048 A | 8/2001 |
| JP | 2003-107555 A | 4/2003 |
| JP | 2003-107567 A | 4/2003 |
| JP | 2003-189325 A | 7/2003 |
| JP | 2005-027277 A | 1/2005 |
| JP | 2005-086682 A | 3/2005 |
| JP | 2005-176028 A | 6/2005 |
| JP | 2005-184508 A | 7/2005 |

* cited by examiner

*Primary Examiner*—John B Strege
(74) *Attorney, Agent, or Firm*—Drinker Biddle & Reath LLP

(57) ABSTRACT

A camera is provided that includes a face detection means, an AE&AWB detection circuit, and a processor. The face detection means detects a face from an input image signal and extracts a facial region comprising the face and an upper body region. The AE&AWB detection circuit calculates a brightness appraisal amount on the basis of brightness of the facial region and the upper body region extracted by the face detection circuit. The processor calculates an exposure amount on the basis of the brightness appraisal amount calculated by the AE&AWB detection circuit.

18 Claims, 6 Drawing Sheets

DIGITAL CAMERA WITH FACE DETECTION FUNCTION FOR FACILITATING EXPOSURE COMPENSATION

CROSS-REFERENCE TO RELATED PATENT APPLICATION

This application claims the benefit of Japanese Patent Application No. 2005-0373700, filed on Dec. 27, 2005, in the Korean Intellectual Property Office, the disclosure of which is incorporated herein in its entirety by reference.

BACKGROUND OF THE INVENTION

1. Field of the Invention

The present invention relates to a camera with a face detection function for facilitating exposure compensation while photographing an image.

2. Description of the Related Art

Conventional cameras often estimate a position of a person using a somewhat inaccurate guess of framing or automatic focus information when photographing or capturing an image of a person. Furthermore, such convention cameras correct a brightness level of an entire image to achieve an appropriate brightness level of an image of a person. Also, conventional cameras may detect a region of skin colour of a person and control the colour of the region of skin colour of that person to be as close to a predetermined skin colour of a person as disclosed in Japanese Patent Publication No. 2005-176028. In other ways, a conventional camera detects a facial region as a target using a face detection function, and controls light intensity of a flash, exposure, and white balance using the density or colour balance of the detected facial region as disclosed in Japanese Patent Publication Nos. 2001-222048, 2005-184508, 2003-189325, 2003-107555, 2005-086682, 2005-027277 and 2003-107567.

Also, according to white balance control under a tungsten light source, white balance is controlled by convention cameras such that some reddish colour remains in order to reproduce colour as close to how a photographer recollects the colours of a desired image as being.

However, when the exposure and/or light intensity of a flash is controlled with excessive weight on a facial region or a skin region of a human subject, a background of the human subject being photographed may appear as a white colour, or flare may occur over an entire image being photographed. When white balance control is performed such that a reddish colour remains under a tungsten light source, white clothes such as a wedding dress may take on a reddish colour, and a white colour may more noticeable as compared to other colours so that a photographer feels that a photographed image is different from an image according to his or her recollection. Also, since exposure controls and white balance controls may be quite different between subsequent photographed images where a face is successfully detected in a first image and where a face is not successfully detected in a next image, for example, during a continuous shooting mode, the exposures or colours may become unstable between images such that proper photographed images cannot be obtained.

SUMMARY OF THE INVENTION

According to an aspect of the present invention, there is provided a camera including: a face detection means that detects a face from an input image signal and which extracts a facial region including the face, and a upper body region; an automatic exposure detection means that calculates a brightness appraisal amount according to a brightness of the facial region and the upper body region; and a processing means that calculates an exposure amount according to the brightness appraisal amount calculated by the automatic exposure detection means.

According to another aspect of the present invention, there is provided a camera including: a flash; a face detection means that detects a face from an input image signal and which extracts a facial region including the face, and a upper body region; an automatic exposure detection means that calculates a brightness appraisal amount on the basis of brightness of the facial region and upper body region extracted by the face detection means; and a processing means that calculates a light emission amount of the flash on the basis of the brightness appraisal amount calculated by the automatic exposure detection means.

According to another aspect of the present invention, there is provided a camera including: a face detection means that detects a face from an input image signal and which extracts a facial region including the face and a upper body region; an automatic white balance detection means that calculates a white balance amount to be controlled on the basis of colours of a facial region and a upper body region extracted by the face detection means; and a processing means that controls a white balance control on the basis of the white balance amount to be controlled which is detected by the automatic white balance detection means.

DETAILED DESCRIPTION OF THE EMBODIMENTS

Figure 1:
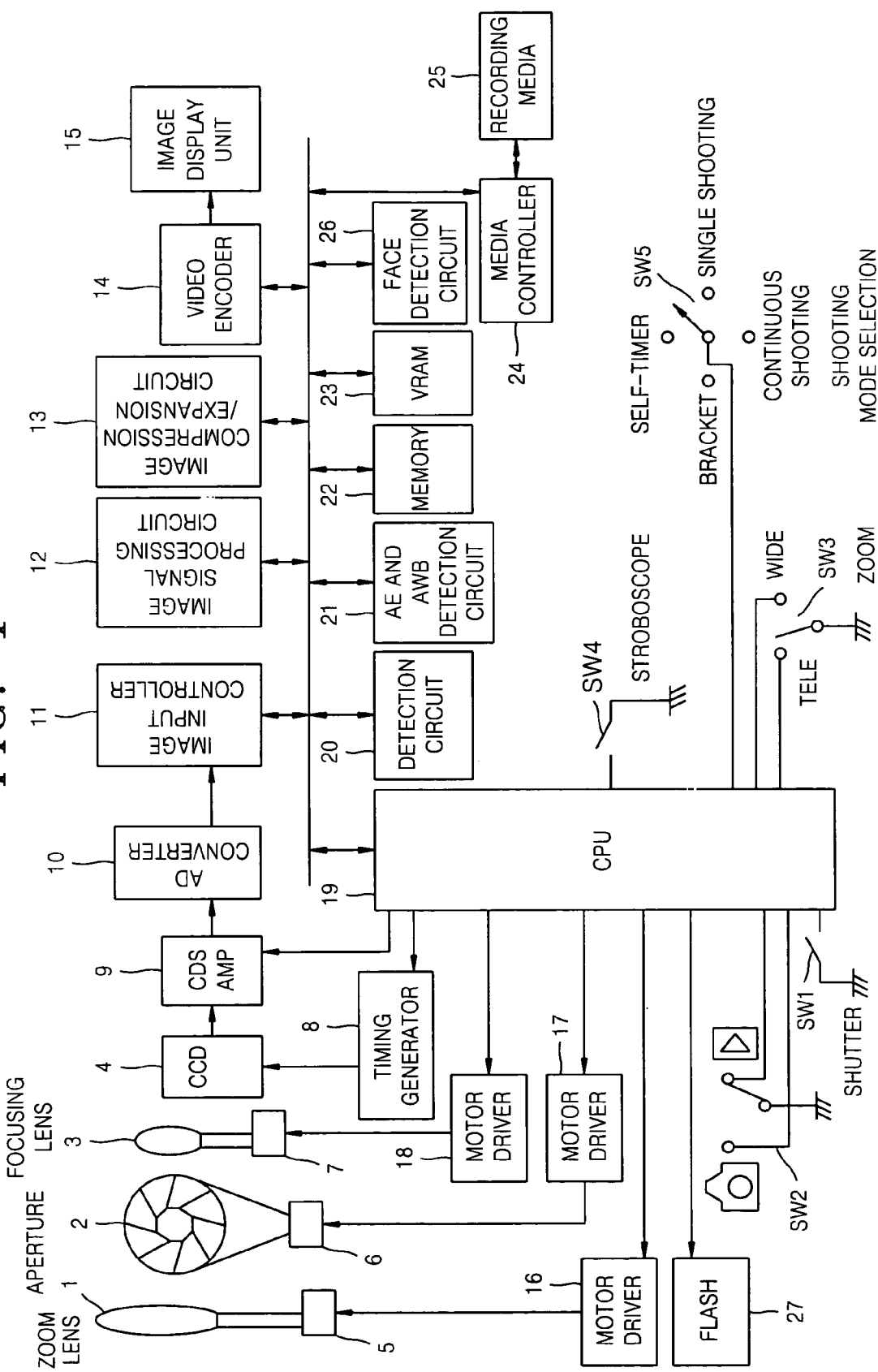
FIG. 1 is a block diagram illustrating a construction of a example digital camera according to an embodiment of the present invention.

The present invention will now be described more fully with reference to the accompanying drawings, in which exemplary embodiments are shown. FIG. 1 is a block diagram illustrating a construction of a digital camera according to an embodiment of the present invention. The present invention will be described using a digital camera as an example of an embodiment.

The digital camera according to the present embodiment includes a zoom lens 1, an aperture 2, a focusing lens 3, an image sensor 4 such as a charged coupled device (CCD), a zoom motor 5, an aperture motor 6, a focus motor 7, a timing generator 8, a correlated double sampling amplifier (CD-SAMP) circuit 9, and a flash 27. The zoom lens 1, the aperture 2, the focusing lens 3, and the image sensor 4 constitute a photographing unit that photographs an object.

The aperture motor 6 constitutes an aperture variation part changing an opening degree of the aperture 2. The timing generator 8 constitutes a shutter speed variation part changing a shutter speed.

The CDSAMP circuit 9 serves as a gain variation part that changes an amplified degree of an output from the image sensor 4 of the photographing unit. The aperture motor 6, the timing generator 8, and the CDSAMP circuit 9 constitute an exposure changing element that changes an exposure state of the photographing unit.

The zoom motor 5 can move a position of the zoom lens 1. The aperture motor 6 may control the opening degree of the aperture 2. The focus motor 7 may control a position of the focusing lens 3. Light that passes through the zoom lens 1, the aperture 2, and the focusing lens 3 forms an image of an object/subject being photographed on a light-receiving surface of the image sensor 4.

The image sensor 4 converts the image on the light-receiving surface of the image sensor 4 to electronic data or signals by a photoelectric process. The image sensor 4 may be one of a CCD and a complementary metal oxide semiconductor (CMOS). A colour filter may be located on the entire surface of the image sensor 4. The colour filter may one or more of a primary colour filter that includes red (R), green (G), and blue (B) colours, and a complementary colour filter that includes cyan (Cy), magenta (Mg), and yellow (Ye) colours.

The image sensor 4 is operated by a timing signal from the timing generator 8.

The flash 27 emits a light having an intensity (brightness) and a duration as determined by a CPU 19.

The digital camera according to the present embodiment includes an analog/digital (A/D) converter 10, an image input controller 11, an image signal processing circuit 12, an image compression/expansion circuit 13, a video encoder 14, an image display unit 15, motor drivers 16, 17, 18, the CPU 19, an automatic focus (AF) detection circuit 20, an automatic exposure & automatic white balance (AE&AWB) detection circuit 21, a memory 22, a video random access memory (VRAM) 23, a media controller 24, a recording medium 25, and a face detection circuit 26. Also, the digital camera includes a shutter switch SW1, a recording/playback switch SW2, a zoom switch SW3, a flash switch SW4, and a shooting mode selection switch SW5.

The A/D converter 10 converts an image signal, which is output from the image sensor 4 and input from the CDSAMP circuit 9, into a digital image signal. The image input controller 11 supplies a digital image signal, which is output from the A/D converter 10, to the CPU 19.

The image signal processing circuit 12 performs image signal processing such as gamma correction, edge strengthen, and white balance control on an input digital image signal. The CPU 19 sets the parameters for these image signal processings. The image compression/expansion circuit 13 compression-codes an input digital image signal.

A compression standard of image data may be Joint Photographic Experts Group (JPEG), for example. The JPEG is a standard for compressing an image using a discrete cosine transform (DCT). However, a compression standard of image data is not limited thereto.

The VRAM 23 stores image data displayed on the image display unit 15.

The video encoder 14 reads image data stored in the VRAM 23, generates a component colour video signal on the basis of the image data, and outputs the generated component colour video signal on the image display unit 15. The image display unit 15 may be a display device such as a liquid crystal display (LCD) displaying a colour image on the basis of an input component colour video signal.

The CPU 19 is a processing element that controls operation of one or more various parts of the digital camera. The CPU 19 receives user input signals from the shutter switch SW1, the recording/playback switch SW2, the zoom switch SW3, the flash switch SW4, and the shooting mode selection switch SW5. In response to one or more user input signals that are output from the foregoing switches SW1-SW5, the CPU 19 outputs one or more signals including but not limited to, a zoom driving signal for moving the zoom lens 1, a focusing lens driving signal for moving the focusing lens 3, an aperture driving signal for opening/closing the aperture 2, and a gain control signal for controlling a gain of the CDSAMP circuit 9.

The memory 22 may include a read only memory (ROM), which is a non-volatile memory that stores a program for operating the CPU 19, and/or a random access memory (RAM), which is a volatile memory used as a work memory when the CPU 19 operates.

The AF detection circuit 20 performs AF on the basis of an output from the image sensor 4. The AF detection circuit 20 detects a high frequency component of an image signal in order to perform focus control. That is, a high frequency component of an image signal increases at a focusing point.

Therefore, it is possible to determine a focused state by detecting the high frequency component of an image signal. The high frequency component of an image signal is detected by the AF detection circuit 20, and integrated over a predetermined focus region, so that a required AF appraisal value is calculated. The required AF appraisal value is supplied to the CPU 19.

Figure 2:
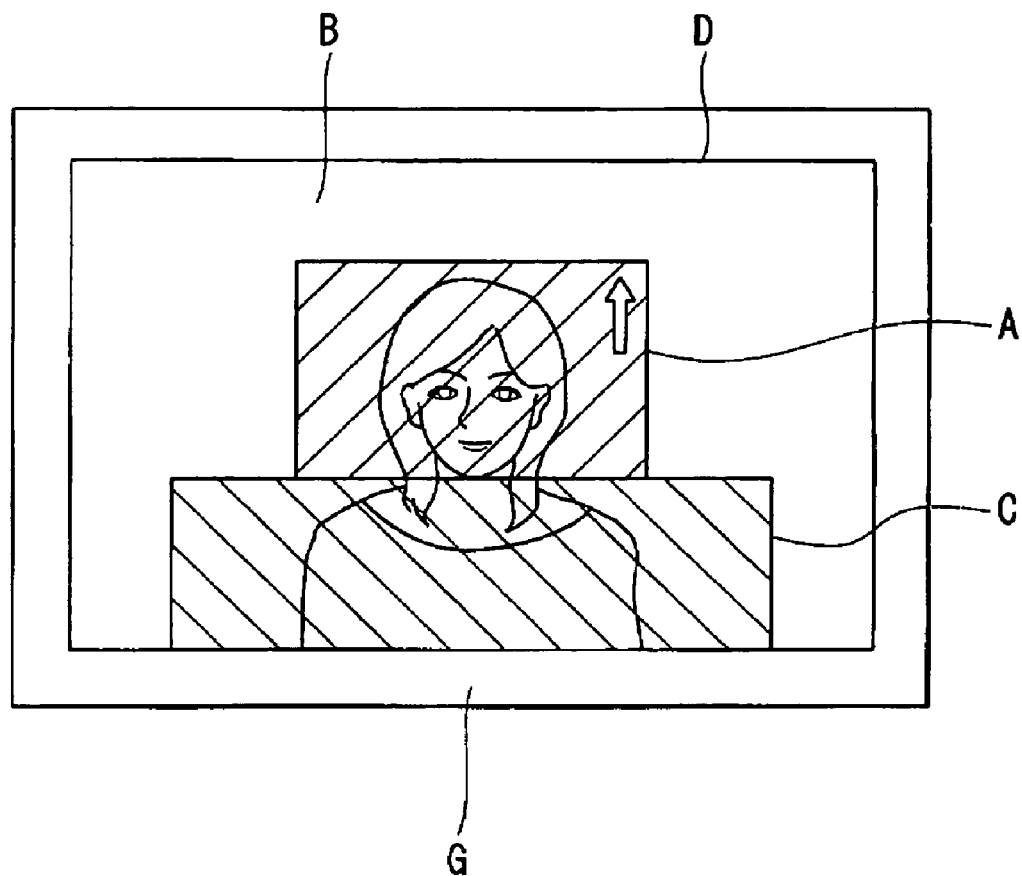
FIG. 2 is a view illustrating an example of an image including a facial region A, a region B that excludes the facial region A and an upper body region C from an automatic exposure (AE) processing region D, and the upper body region C according to an embodiment of the present invention.

Referring now to FIG. 2, operation of the face detection circuit 26 is described. As shown in FIG. 2, the face detection circuit 26 detects the facial region A and the upper body region C contained in an image signal which is output from the image sensor 4. As can be appreciated, the region B may be considered as a background region within the automatic exposure (AE) operation region D because region B does not include the facial region A or the upper body region C. First, the face detection circuit 26 extracts a skin colour region from the image signal. Next, the face detection circuit 26 performs outline extraction on the extracted region on the basis of a brightness change, and checks whether both eyes and a mouth exist on locations that supposedly correspond to both eyes and the mouth. When both eyes and the mouth are determined to exist, a region that corresponds to the locations is detected as the facial region A, and up and down locations of the facial region are determined using positions relative to both eyes and the mouth. Next, the upper body region C located below the facial region A is extracted and obtained by, for example, multiplying the facial region A by a predetermined magnification.

The face detection circuit 26 outputs attributes of the detected facial region A and upper body region C to the CPU 19.

Since the AE&AWB detection circuit 21 controls image exposure, image white balance and light emission intensity and duration of the flash, the AE&AWB detection circuit 21 generates an exposure control signal and a white balance control signal in response to an image signal, which is output from the image sensor 4, and outputs the exposure control signal and the white balance control signal to the CPU 19.

The exposure control signal may be a brightness appraisal value that represents brightness of an image. When an image signal is input, the AE&AWB detection circuit 21 determines an average brightness of facial region A (average_A) that was detected by the face detection circuit 26, an average brightness of region B (average_B) that was detected by the face detection circuit 26, and an average brightness of the upper body region C (average_C) that was detected by the face detection circuit 26. The CPU 19 in cooperation with AE&AWB detection circuit 21 then calculates a brightness appraisal value or exposure control signal according to Equation 1.

$$(n*average\_A + average\_B + k*average\_C)/(n+1+k) \quad \text{Equation 1}$$

where, n is a predetermined integer such that n>1, and k is a weight coefficient such that $0 \leq k$.

Figure 3:
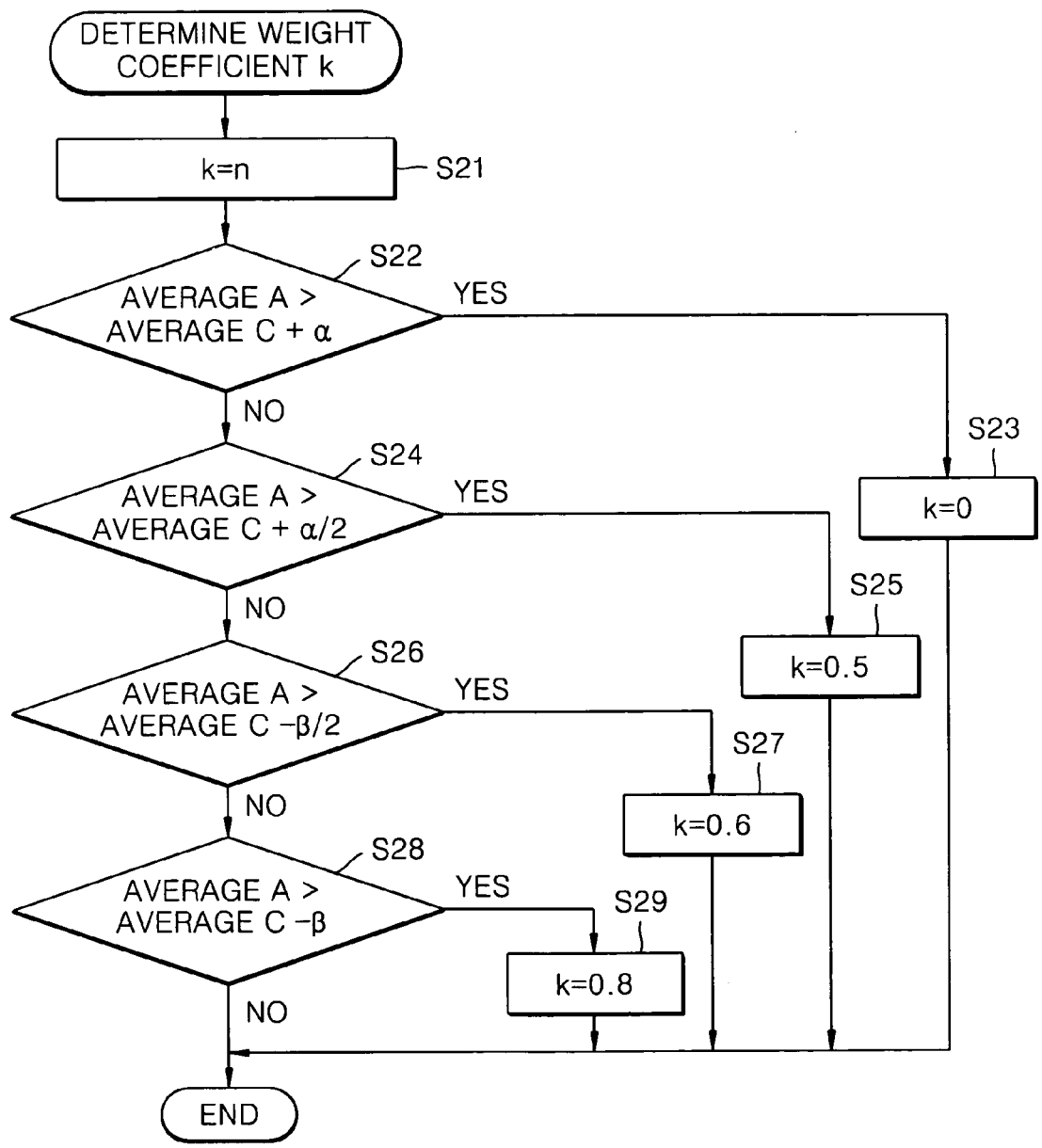
FIG. 3 is a flowchart of an example method of determining the weight coefficient k for calculating a brightness appraisal value according to an embodiment of the present invention

FIG. 3 is a flowchart of a method of determining the weight coefficient k, which is used in Equation 1 to calculate a brightness appraisal value, according to an embodiment of the present invention.

Initially in step S21, the weight coefficient k is set equal to integer n. However, in step S22, when the average brightness of the facial region A (average_A) is determined to be greater than a value obtained by adding a positive integer a to the average brightness of the upper body region C (average_C), then in step S23 k is set to zero. However, in step S22, if the average brightness of the facial region A (average_A) is determined to be less than the threshold value, the method proceeds to step S24 in which it is determined if the average brightness of the facial region A (average_A) is greater than a value obtained by adding a positive integer $\alpha \times 0.5$ to the average brightness of the upper body region C (average_C). If the determination in step S24 is affirmative, k is set to 0.5 in step S25. If the determination in step S24 is negative, the method proceeds to step S26 in which it is determined if the average brightness of the facial region A (average_A) is greater than a value obtained by subtracting a positive integer $\beta \times 0.5$ from the average brightness of the upper body region C (average_C). If the determination in step S26 is affirmative, k is set to 0.6 in step S27. If the determination in step S26 is negative, the method proceeds to step S28 in which it is determined if the average brightness of the facial region A (average_A) is greater than a value obtained by subtracting a positive integer $\beta$ from the average brightness (average_C) of the upper body region C. If the determination in step S28 is affirmative, k is set to 0.8. in step S29.

Since flash intensity and exposure are controlled on the basis of a brightness appraisal value that is calculated such that weight coefficient k for the average brightness of the upper body region C increases as the average brightness of the upper body region C is greater than the average brightness of the facial region A, in view of the foregoing, a background does not appear as white colour due to excessive exposure, and/or flare does occur over an entire image.

Also, white balance control signals may utilize gains B and R. The gain B may be a magnification multiplied with a blue component of each pixel during white balance control. Similarly, the gain R may be a magnification multiplied with a red component of each pixel during white balance control. Also, during white balance control, three primary colours may be balanced by multiplying a blue component of each pixel by gain B and multiplying a red component of each pixel by gain R without changing (e.g., multiplying by 1) a green component of each pixel. Next, a flowchart of a method of calculating the gains B and R will be described with reference to FIG. 4.

Figure 4:
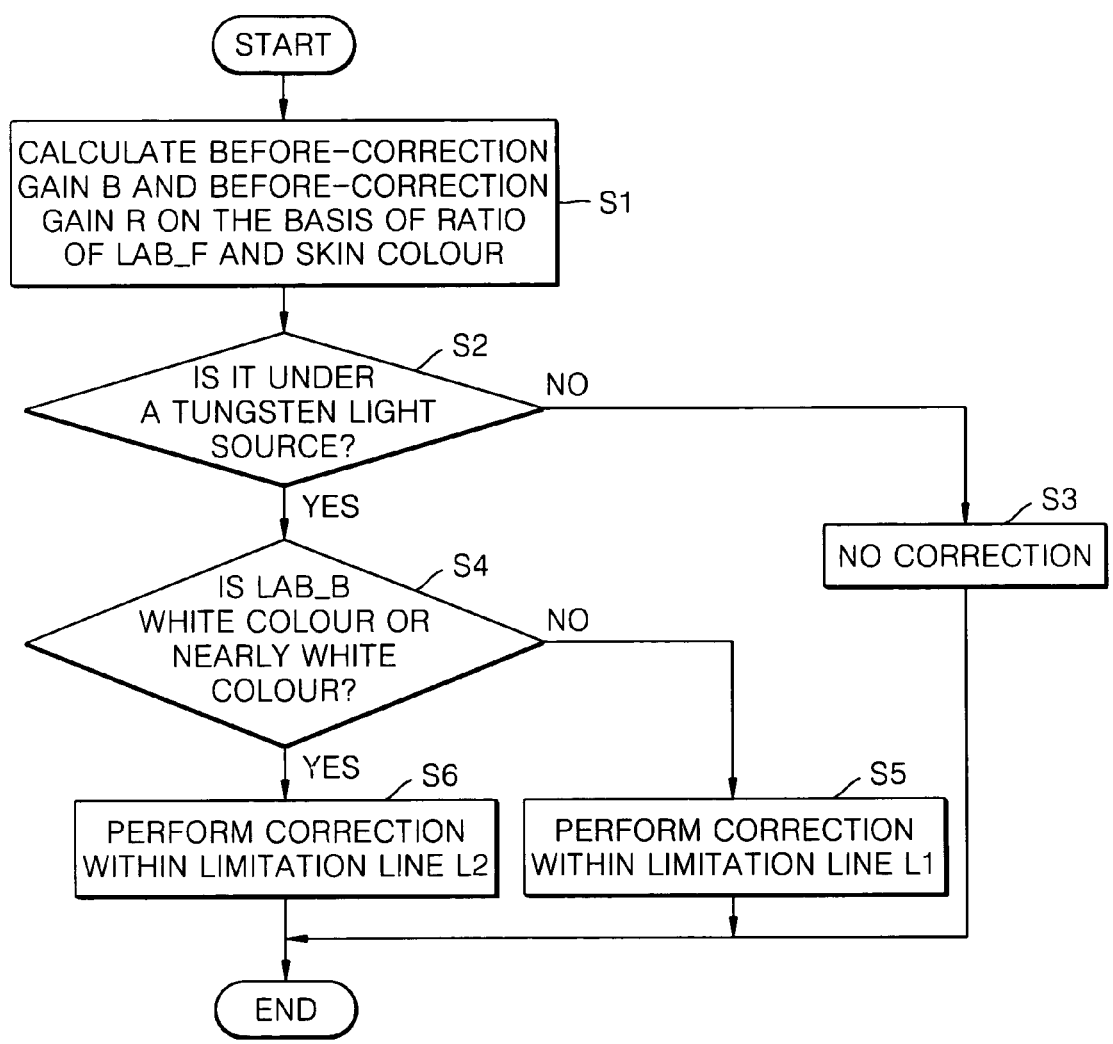
FIG. 4 is a flowchart illustrating an example method of calculating a gain B and a gain R using an automatic exposure & automatic white balance (AE&AWB) detection circuit according to an embodiment of the present invention.

FIG. 4 is a flowchart of a method of calculating the gain B and the gain R using the AE&AWB detection circuit 21, according to an embodiment of the present invention.

A value called Lab_F is calculated as L*a*b, where L is the average value of red components of all of the pixels, a is the average value of green components of all of the pixels, and b is the average value of blue components of all of the pixels in the facial region A, which is detected by the face detection circuit 26. Another value called Lab_B is calculated in a similar manner for the upper body region C and another value called Lab_A is calculated in a similar manner for the entire image.

In step S1, the AE&AWB detection circuit 21 calculates a before-correction gain R (Gr) and a before-correction gain B (Gb) that satisfy Equation 2 (S1), that is, a condition where ratios Rs:Bs:Gs for red, blue, and green components Rs, Bs, and Gs constituting a skin colour equals to ratios Rf×Gr:Bf× Gb:Gf wherein a red component Rf is multiplied with the before-correction gain R (Gr), and a blue component Bf is multiplied with the before-correction gain B (Gb).

$$Rs:Bs:Gs=(Rf \times Gr):(Bf \times Gb):Gf \quad \text{Equation 2}$$

Figure 5:
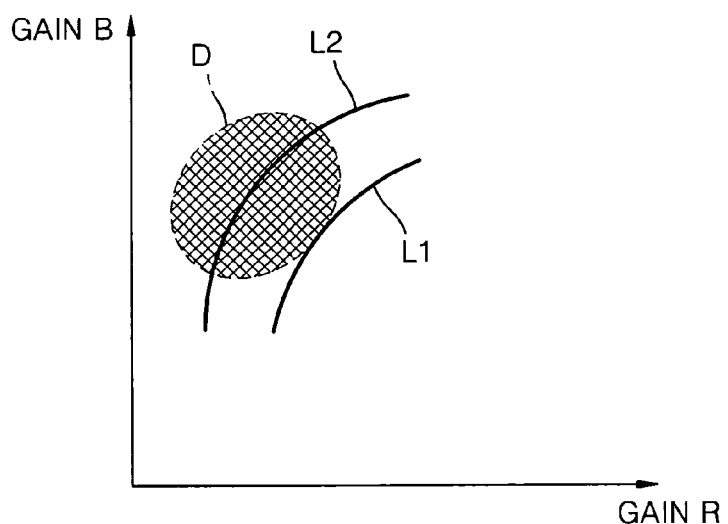
FIG. 5 is a view illustrating white balance control limitation relative to a tungsten light source according to an embodiment of the present invention.

Next in step S2, the AE&AWB detection circuit 21 determines whether an input image signal is a signal of an image photographed under a tungsten light source. A first condition for determining photography with a tungsten light source is determination of location of a point on a two-dimensional plane having a horizontal axis representing a gain R and a vertical axis representing a gain B as illustrated in FIG. 5 wherein the point has coordinates corresponding to the before-correction gain B and the before-correction gain R. More specifically, it is determined if the point is located within a predetermined region D (shown as a shaded or hatched area) of the two-dimensional plane. A second condition for determining is that the standard deviation of colour for each pixel contained in the facial region A is smaller than a predetermined value. When at least one of the foregoing conditions is not satisfied, the AE&AWB detection circuit 21 maintains the before-correction gain B and the before-correction gain R as the gains B and R, respectively (S3). On the other hand, when both conditions are satisfied, it is then determined in step S4 whether a target in an image has white clothes or light clothes. Conditions for determining whether the target in an image has white clothes or light clothes are that the three following conditions for Lab B must be all satisfied over Lab_F:

1) Brightness is high;

2) Saturation is low (colour is close to an achromatic colour); and

3) Standard deviation of colour for each pixel is smaller than a predetermined value (i.e. distribution is not wide).

When at least one of the three conditions above is not satisfied, the AE&AWB detection circuit 21 moves a point represented as a combination of a before-correction gain B and a before-correction gain R in the two-dimensional space consisting of a horizontal axis representing a gain R and a vertical axis representing a gain B, to a gain axis R along a limitation line L1 illustrated in FIG. 5 using a predetermined rule, and determines coordinates of the point moved to the gain axis R as a gain B and a gain R after a correction (S5). As described above, for an image photographed under a tungsten light source, values are corrected such that a gain B decreases and a gain R increases compared to results of Equation 2, so that the image takes on a reddish colour.

When the three conditions above are satisfied, the AE&AWB detection circuit 21 moves a point represented as a combination of a before-correction gain B and a before-correction gain R in the two-dimensional space consisting of a horizontal axis representing a gain R and a vertical axis representing a gain B to a gain axis B along a limitation line L2 illustrated in FIG. 5 using a predetermined rule, and determines coordinates of the point moved to the gain axis B as a gain B and a gain R after correction (S6). Since the limitation line L2 is closer to the gain axis B than the limitation line L1, a white colour is reproduced without a reddish colour as if only a condition under a tungsten light source is satisfied when the upper body region C (FIG. 2) has a white colour or nearly a white colour even under a tungsten light source.

Actuation of the shutter switch SW1 causes the digital camera to photograph an image when a recording mode is selected.

Actuation of the recording/playback switch SW2 causes selection of: a recording mode in which the digital camera operates to photograph an image; or a playback mode that displays a photographed image on the image display unit 15. The recording/playback switch SW2 may also set other modes of the digital camera.

Actuation of the zoom switch SW3 causes movement of the zoom lens 1 during the recording mode.

Actuation of the flash switch SW4 sets the digital camera such that the flash 27 illuminates during the recording mode.

Actuation of the shooting mode selection switch SW5 causes selection of one shooting mode of a self-timer mode, a continuous shooting mode, a single shooting mode, and a bracketing mode.

The media controller 24 writes and reads data to and from the recording medium 25.

The recording medium 25 is a medium on which compression-coded image signals are recorded as an image file. For example, the recording medium 25 may be a detachable card type memory that uses a flash memory. Also, the recording medium 25 may be one of a built-in non-volatile memory of a digital camera, a magnetic tape, a magnetic disk, and an optical disk.

Next, an operation when power of the digital camera is turned on will be described. When a user manipulates a power switch (not shown), the main power of the digital camera is turned on/off. When the power is turned on, the digital camera initializes the memory, zooming, a digital signal processor (DSP), and various drivers 16, 17, and 18.

When the recording/playback switch SW2 is set to the recording mode, the image sensor 4 continuously receives an image even when an image is not being photographed, and a digital image signal is input to the CPU 19 by way of the CDSAMP circuit 9, the A/D converter 10, and the image input controller 11. The CPU 19 outputs the digital image signal to the image signal processing circuit 12, and simultaneously, outputs the digital image signal to the face detection circuit 26. The image signal processing circuit 12 performs image processing such as gamma correction, edge strengthen, and white balance control on the input digital image signal. The digital image signal is stored in the VRAM 23 as image data by the CPU 19. The video encoder 14 generates a component colour video signal with reference to image data stored in the VRAM 23, and outputs the component colour video signal to the image display unit 15. The image display unit 15 displays the image that is being photographed.

The face detection circuit 26 that has received the digital image signal from the CPU 19 detects positions of a facial region A (FIG. 2) and an upper body region C (FIG. 2) from the digital image signal, and outputs the detected positions to the CPU 19. The CPU 19 receives the positions of the facial region A and the upper body region C, inputs the received positions of the facial region and the upper body region and the digital image signal to the AE&AWB detection circuit 21, and obtains an exposure control signal and a white balance control signal in response to the received positions and digital image signal. When the flash switch SW4 is set to firing, the CPU 19 calculates light intensity of the flash 27 and an exposure amount in response to the exposure control signal. When the flash switch SW4 is set to firing of the flash 27, the CPU 19 calculates an exposure amount in response to the exposure control signal. The CPU 19 outputs an aperture driving signal and a gain set signal on the basis of the calculated exposure amount. The aperture driving signal is provided to the aperture motor 6 through the motor driver 17, and the opening degree of the aperture 2 is controlled such that an exposure signal has a predetermined signal level. Also, the gain set signal is provided to the CDSAMP circuit 9, and a gain of the CDSAMP circuit 9 is controlled such that the exposure signal has a predetermined signal level. The CPU 19 sets gains B and R of the image signal processing circuit 12 in response to a white balance control signal. The exposure and the white balance are always controlled in an optimum state as described above so that photographing may be performed anytime.

Also, when the zoom switch SW3 is controlled, the CPU 19 outputs a zoom driving signal, which is provided to the zoom motor 5 through the motor driver 16. The zoom motor 5 moves the zoom lens 1.

Next, an operation performed when an image is photographed will be described. First, a case where the shooting mode selection switch SW5 is set to the "single shooting" mode will be described. When the shutter switch SW1 is pressed, the CPU 19 detects the pressing of the shutter switch SW1 and transmits a shutter signal to the timing generator 8. When the shutter is pressed, a photographed image is sent to the image sensor 4. At this time, when the flash switch SW4 is set to firing, a firing signal that designates light intensity calculated in response to an exposure control signal is transmitted to the flash 27, and the flash 27 fires at a time when the photograph image is received by the image sensor 4. The image sensor 4 outputs the received image as an analog image signal. This analog image signal is gain-controlled by the CDSAMP circuit 9, and converted into a digital image signal by the A/D converter 10. This digital image signal is provided to the CPU 19 through the image input controller 11. After that, the image signal processing circuit 12 performs processings such as gamma correction, edge strengthen, white balance control, and YC conversion on the received digital image signal, and the image compression/expansion circuit 13 compresses data of the digital image signal. Then, the compressed data is recorded as an image file on the recording medium 25.

Figure 6:
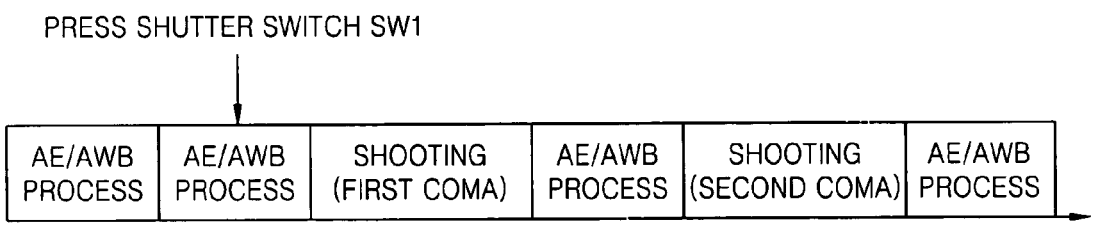
FIG. 6 is a view illustrating an example operation in a continuous shooting mode according to an embodiment of the present invention.
Figure 7:
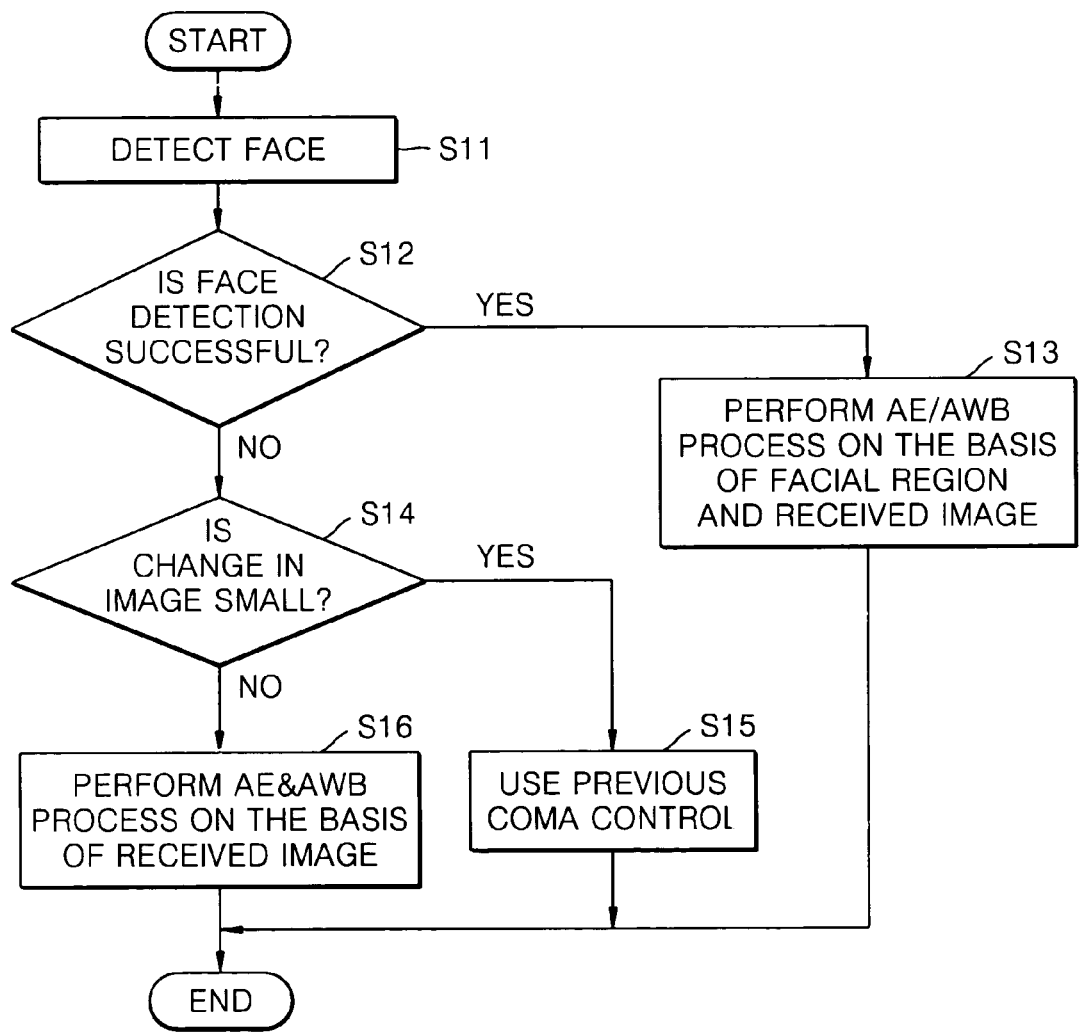
FIG. 7 is a flowchart illustrating an example operation of a CPU in a continuous shooting mode according to an embodiment of the present invention.

Next, an operation performed when the shooting mode selection switch SW5 is set to a "continuous shooting" mode will be described. The continuous shooting mode is a mode where shooting of an image is continuously performed up to a predetermined number of images when the shutter switch SW1 is pressed. An operation when shooting is performed for each image is the same as the operation performed after the CPU 19 transmits a shutter signal to the timing generator 8 in a single shooting mode. In the present embodiment, description of shooting performed for each image is omitted, and an operation between images will be described. Referring to FIG. 6, in the continuous shooting mode, the AE&AWB detection circuit 21 outputs an exposure control signal and a white balance control signal on the basis of an image received by the image sensor 4 and an output result from the face detection circuit 26, even after shooting first image. Then, the CPU 19 performs opening degree control of the aperture 2, exposure control that adjusts a gain of the CDSAMP circuit 9, and white balance control that adjusts gains B and R of the image signal processing circuit 12. Also, when the switch SW4 for the flash is ON, the CPU 19 further performs light emitted amount control for the flash. However, after a second image, the CPU 19 performs light intensity control and white balance control for each image after the second image according to a flowchart illustrated in FIG. 7 and then shooting of an image is performed.

For example, a continuous shooting mode for a case where a subject being photographed a predetermined number of times (e.g., an (x−1)th image) is a face and wherein the subject of the next image being photographed (e.g., the xth image) changes from the face to another object after a number of photographed images are captured. In this case, once the face detection circuit 26 succeeds in detecting a face during a first image, and light intensity control, exposure control, and white balance control that reflect the detected face are performed, shooting of an image is performed. After that, for up to the (x−1)th image after a second image, the CPU 19 inputs an image received by the image sensor 4 to the face detection circuit 26, which performs face detection on the input image and a facial region A, which is a result of the face detection, is sent to the CPU 19 (S11). Next, in operation S12, whether face detection has been successful is determined. When the face detection is successful during a second image, operation S13 is performed. The CPU 19 inputs an image received by the image sensor 4 and the facial region A to the AE&AWB detection circuit 21, and performs light intensity control, exposure control, and white balance control in response to the exposure control signal and the white balance control signal obtained as a result of AE &AWB detection (S13). Light intensity control, exposure control, and white balance control are performed in this manner for each of the images up to the (x−1)th image where a face is being photographed.

Next, if it is determined at a point in time during photographing that a face is not contained in an image photographed (e.g., the xth image) as described above, the CPU 19 inputs an image received by the image sensor 4 to the face detection circuit 26, but the face detection circuit 26 fails to detect a face for the input image and outputs such a result to the CPU 19. Next, in an operation S12, whether a face detection has been successful is determined. If the face detection failed, operation S14 is performed. In operation S14, whether a change in an image between images is small is determined. The judgment is performed using Equation 3 as set forth below:

$$abs(ave[y]-ave[y-1])<H, abs(1-((R[y]\times G[y-1])/(G[y]\times R[y-1])))<I, abs(1-((R[y]\times G[y-1])/(G[y]\times R[y-1])))<J \qquad \text{Equation 3}$$

where H, I and J are small positive integers, abs( ) is a function for calculating an absolute value, ave[ ] is a brightness average value of an image for an image, and R[ ], G[ ], and B[ ] are average values of red, green, and blue components for an image, respectively.

Since the change in an image between images is small, Equation 3 is satisfied, that is, a condition of operation S14 is satisfied, and operation S15 is performed. In operation S15, light intensity control, exposure control, and white balance control are performed under the same conditions of a previous image ((x−1)th image). Next, since a face is not photographed and change in an image is small even after an (x+1)th image so that a condition of the operation S12 is not satisfied and a condition of the operation S14 is satisfied such that operation S15 is performed. In operation S15, light intensity control, exposure control, and white balance control are performed under the same conditions of a previous image. Since shooting is performed under the same light intensity control, the same exposure control, and the same white balance control as those for a last image where a face is photographed even when a face is not photographed in the case where change in an image is small, stable exposure and colour are achieved between images.

Next, for another embodiment, a case where change in an image is great during a continuous shooting mode, a face is photographed for up to an (x−1)th image, and a face is not photographed for images starting from an xth image will be described. Similar to a case where change in an image is small during the continuous shooting mode, the face detection circuit 26 succeeds in detecting a face, light intensity control, exposure control, and white balance control that use the detected face, and then shooting of an image is performed during a first image. Next, up to an (x−1)th image after a second image, the CPU 19 inputs an image received by the image sensor 4 to the face detection circuit 26, which performs face detection on the input image, and outputs a facial region, which is a result of the face detection, to the CPU 19 (S11).

Next, in operation S12, whether the face detection has been successful is determined. Since the face detection has been successful during the second image, operation S13 is performed. The CPU 19 inputs an image received by the image sensor 4 and the facial region to the AE&AWB detection circuit 21, and performs light intensity control, exposure control, and white balance control in response to the exposure control signal and the white balance control signal obtained as a result of AE & AWB detection (S13). Light intensity control, exposure control, and white balance control are performed in this manner for each of the images up to the (x−1)th image where a face is contained.

Since a face is not contained in an image photographed under an xth image as described above, the CPU 19 inputs an image received by the image sensor 4 to the face detection circuit 26, but the face detection circuit 26 fails to detect a face for the input image and outputs such a result to the CPU 19. Next, in operation S12, whether face detection has been successful is determined. Here, since the face detection has failed, operation S14 is performed. In operation S14, whether a change in an image between images is small is determined using Equation 3. Since the change in the image between images is great as described above, Equation 3 is not satisfied, and the condition of operation 14 is not satisfied so that operation S16 is performed. In operation S16, the CPU 19 obtains the exposure control signal and the white balance control signal output from the AE&AWB detection circuit 21 on the basis of a received image. Also, light intensity control, exposure control, and white balance control are performed in response to the obtained exposure control signal and white balance control signal.

Next, since a face is not contained and the change in the image is great even after an (x+1)th image as described above, the condition of operation S12 is not satisfied, operation S14 is not satisfied, and operation S16 is performed. In operation S16, the CPU 19 obtains an exposure control signal and a white balance control signal output from the AE&AWB detection circuit 21 on the basis of a received image. Also, light intensity control, exposure control, and white balance control are performed in response to the obtained signal. When the change in the image is great between images as described above, light intensity control, exposure control, and white balance control are performed on the basis of information obtained from each image so that optimized shooting of an image is performed. By doing so, a shot image suitable for each image is obtained.

When the recording/playback switch SW2 is switched to playback, the digital camera is set to a playback mode. During the playback mode, an image file recorded on the recording medium 25 is opened through the media controller 24 by the control of the CPU 19 and image data is read. The CPU 19 provides image data read from the recording medium 25 to the image compression/expansion circuit 13, which performs an expansion process on the image data, and stores the expanded image data in the VRAM 23. The video encoder 14 generates the component colour video signal with reference to the expanded image data stored in the VRAM 23 and provides the generated component colour video signal to the image display unit 15, which displays a reproduced image.

Since light intensity control and exposure control are performed on the basis of the same brightness appraisal value according to the present embodiment, light intensity control and exposure control may be performed on the basis of a value calculated using other methods such as changing the weight coefficient k in Equation 1 when calculating the brightness appraisal value.

According to the present invention, exposure control is performed in response to an exposure control signal generated on the basis of brightness of a facial region and brightness of an upper body region so that a background does not appear as white colour due to excessive exposure, or flare is not generated over an entire image, and thus, a proper image may be obtained.

Also, according to the present invention, light intensity control is performed in response to an exposure control signal generated on the basis of brightness of a facial region and brightness of an upper body region so that a background does not appear as white colour due to excessive exposure, or flare is not generated over an entire image, and thus, a proper image may be obtained.

Also, according to the present invention, white balance control is performed in response to a white balance control signal generated on the basis of colours of a facial region and colours of an upper body region so that white clothes are not photographed to take on a reddish colour even under a tungsten light source, and thus, a proper image may be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital camera comprising:
a face detection means for detecting a face from an input image signal defining a subject being photographed, the face detection means extracting a facial region including the face of the subject and an upper body region of the subject;
an automatic exposure detection means for calculating a brightness appraisal amount according to a facial region brightness and an upper body region brightness; and
a processing means for calculating an exposure amount to adjust the input image signal according to the brightness appraisal amount.

2. The digital camera of claim 1 further comprising a flash, and wherein the processing means adjusts at least one of a flash intensity and a flash duration according to the brightness appraisal amount.

3. The digital camera of claim 1 wherein the automatic exposure detection means calculates the brightness appraisal amount according to the equation $$(n*average\_A + average\_B + k*average\_C)/(n+1+k)$$

where,
average_A is the facial region brightness,
average_B is the average brightness of the input image signal,
average_C is the upper body region brightness,
n is a predetermined integer such that n>1, and
k is a weight coefficient such that $0 \leq k$.

4. The digital camera of claim 3 wherein the processing means determines the weight coefficient k according to a comparison of average_A to average_C.

5. The digital camera of claim 3 wherein the weight coefficient k is selected from the group consisting of 0.0, 0.5, 0.6, 0.8 and n.

6. The digital camera of claim 1 further comprising:
a means for photographing a plurality of sequential images of the subject, and
a means for determining a change between an image of the plurality of sequential images and a next image of the plurality of sequential images, said means for determining a change being in communication with the face detection means,
wherein the processing means maintains constant the exposure amount when the means for determining a change determines a small change between the image and the next image.

7. The digital camera of claim 6 wherein the means for determining a change calculates a change according to the equations $$abs(ave[y] - ave[y-1]) < H,$$

$$abs(1 - ((R[y] \times G[y-1])/(G[y] \times R[y-1]))) < I, \text{ and}$$

$$abs(1 - ((R[y] \times G[y-1])/(G[y] \times R[y-1]))) < J$$

where, H, I and J are small positive integers,
ave[y−1] is a brightness average value of an image,
ave[y] is a brightness average value of a next image,
R[y−1] and G[y−1] are average values of red and green components, respectively, for an image, and
R[y] and G[y] are average values of red and green components, respectively, for a next image.

8. A digital camera comprising:
a flash;
a face detection module that detects a face from an input image signal and defines an upper body region of a human subject and a facial region of the human subject;
an automatic exposure detection module that calculates a brightness appraisal amount according to a brightness of the facial region and a brightness of the upper body region; and
a processor in communication with the face detection module and the automatic exposure detection module,
wherein the processor adjusts at least one of a flash intensity, a flash duration, a white balance of the input image signal and an exposure of the input image signal based on the brightness appraisal amount.

9. The digital camera of claim 8 wherein the automatic exposure detection module calculates the brightness appraisal amount according to the equation $$(n*average\_A + average\_B + k*average\_C)/(n+1+k)$$

where,
average_A is the facial region brightness,
average_B is the average brightness of the input image signal,
average_C is the upper body region brightness,
n is a predetermined integer such that n>1, and
k is a weight coefficient such that 0≦k.

10. The digital camera of claim 9 wherein the processing means determines the weight coefficient k by comparing average_A to average_C.

11. The digital camera of claim 9 wherein the weight coefficient k is selected from the group consisting of 0.0, 0.5, 0.6, 0.8 and n.

12. The digital camera of claim 8 wherein the automatic exposure detection module comprises:
a means for determining a clothes color of the upper body region of the subject; and
a means for detecting a tungsten light source,
wherein the means for determining a clothes color and the means for detecting a tungsten light source communicate with the processor to adjust the white balance.

13. The digital camera of claim 8 further comprising:
a means for photographing a plurality of sequential images of the subject, and
a means for comparing attributes of an image of the plurality of sequential images and attributes of a next image of the plurality of sequential images, said means for comparing being in communication with the face detection module,
wherein the means for comparing cooperates with the processor to adjust at least one of the flash intensity, the flash duration, the white balance of the input image signal and the exposure of the input image signal according to a variation in the brightness appraisal amount.

14. The digital camera of claim 13 wherein the means for comparing detects a change between an image and a next image according to the equations $$abs(ave[y]-ave[y-1])<H,$$

$$abs(1-((R[y] \times G[y-1])/(G[y] \times R[y-1])))<I, \text{ and}$$

$$abs(1-((R[y] \times G[y-1])/(G[y] \times R[y-1])))<J$$

where, H, I and J are small positive integers,
ave[y−1] is a brightness average value of the image,
ave[y] is a brightness average value of the next image,
R[y−1] and G[y−1] are average values of red and green components, respectively, for the image, and
R[y] and G[y] are average values of red and green components, respectively, for the next image.

15. A method for compensating exposure of a photographic image of a human subject captured by a digital camera with a face detecting means, the method comprising:
processing the photographic image to detect a face of the human subject;
defining a face region;
defining an upper body region;
extracting first attributes relative to the face region;
extracting second attributes relative to the upper body region;
determining an average brightness of the face region relative to the first attributes;
determining an average brightness of the upper body region relative to the second attributes;
calculating a brightness appraisal amount according to the average brightness of the face region and the average brightness of the upper body region; adjusting at least one of an exposure or light intensity or duration of the photographing image according to the brightness appraisal amount;
determining at least a gain for the red component and a gain for the blue component of each pixel;
adjusting a white balance of the photographing image according to the gain for the red component and the gain for the blue component of each pixel.

16. The method of claim 15 wherein the calculating step is defined by the equation $$(n^*average\_A+average\_B+k^*average\_C)/(n+1+k)$$

where,
average_A is the average brightness of the facial region,
average_B is the average brightness of the photographic image,
average_C is the average brightness of the upper body region,
n is a predetermined integer such that n>1, and
k is a weight coefficient such that 0≦k.

17. The method claim 15 further comprising the steps of:
capturing a subsequent photographic image shortly after the adjusting step;
comparing the subsequent photographic image with the photographing image of the adjusting step; and
determining if the subsequent photographic image is substantially similar to the photographing image of the adjusting step.

18. The method of claim 17 wherein the comparing step is defined by the equations $$abs(ave[y]-ave[y-1])<H,$$

$$abs(1-((R[y] \times G[y-1])/(G[y] \times R[y-1])))<I, \text{ and}$$

$$abs(1-((R[y] \times G[y-1])/(G[y] \times R[y-1])))<J$$

where, H, I and J are small positive integers,
ave[y−1] is a brightness average value of the photographing image of the adjusting step,
ave[y] is a brightness average value of the subsequent photographic image,
R[y−1] and G[y−1] are average values of red and green components, respectively, for the photographing image of the adjusting step, and
R[y] and G[y] are average values of red and green components, respectively, for the subsequent photographic image.

* * * * *